United States Patent
Armstrong et al.

(10) Patent No.: US 7,496,915 B2
(45) Date of Patent: Feb. 24, 2009

(54) DYNAMIC SWITCHING OF MULTITHREADED PROCESSOR BETWEEN SINGLE THREADED AND SIMULTANEOUS MULTITHREADED MODES

(75) Inventors: William Joseph Armstrong, Rochester, MN (US); Bruce G. Mealey, Austin, TX (US); Naresh Nayar, Rochester, MN (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 10/422,682

(22) Filed: Apr. 24, 2003

(65) Prior Publication Data

US 2004/0215939 A1  Oct. 28, 2004

(51) Int. Cl.
G06F 9/46 (2006.01)
G06F 11/00 (2006.01)
G06F 1/00 (2006.01)
G05B 15/00 (2006.01)
G05B 11/01 (2006.01)
G05B 13/02 (2006.01)

(52) U.S. Cl. .................. 718/100; 718/104; 718/105; 700/1; 700/27; 700/32; 714/100; 713/300

(58) Field of Classification Search .............. 718/100, 718/108, 102; 712/228–229, 233–234, 220; 713/300; 700/1, 27, 32; 714/100
See application file for complete search history.

(56) References Cited

U.S. PATENT DOCUMENTS

| 5,345,590 | A | * | 9/1994 | Ault et al. ................ 718/1 |
| 5,515,538 | A | * | 5/1996 | Kleiman .................... 710/260 |
| 5,835,705 | A | * | 11/1998 | Larsen et al. ............ 714/47 |
| 5,944,816 | A | * | 8/1999 | Dutton et al. ............ 712/215 |
| 6,052,708 | A | | 4/2000 | Flynn et al. |
| 6,061,710 | A | * | 5/2000 | Eickemeyer et al. ....... 718/107 |
| 6,341,347 | B1 | | 1/2002 | Joy et al. |
| 6,381,676 | B2 | * | 4/2002 | Aglietti et al. ............ 711/133 |
| 6,546,443 | B1 | * | 4/2003 | Kakivaya et al. ......... 710/200 |
| 6,816,977 | B2 | * | 11/2004 | Brakmo et al. ............ 713/323 |
| 6,971,103 | B2 | * | 11/2005 | Hokenek et al. .......... 718/107 |
| 7,043,729 | B2 | * | 5/2006 | Lewis ...................... 718/103 |

(Continued)

FOREIGN PATENT DOCUMENTS

CN 1276887 A 12/2000

(Continued)

OTHER PUBLICATIONS

Borkenhagen et al., "A Multithreaded PowerPC Processor For Commercial Servers," IBM J. Res. Develop., vol. 44, No. 6, Nov. 2000, pp. 885-898.

*Primary Examiner*—Thomas Lee
*Assistant Examiner*—Kenneth Tang
(74) *Attorney, Agent, or Firm*—Wood, Herron & Evans, LLP (57) ABSTRACT

A method utilizes a multithreaded processor having at least one hardware thread among a plurality of hardware threads that is capable of being selectively activated and deactivated responsive to a control circuit. The control circuit additionally provides the capability of controlling how an inactive thread can be activated after the thread has been deactivated, e.g., by enabling or disabling reactivation in response to an interrupt.

11 Claims, 4 Drawing Sheets

U.S. PATENT DOCUMENTS

| | | |
|---|---|---|
| 7,152,169 B2 * | 12/2006 | Cooper et al. ............... 713/320 |
| 2001/0018701 A1 * | 8/2001 | LiVecchi .................... 709/105 |
| 2002/0032850 A1 * | 3/2002 | Kauffman .................... 712/31 |
| 2002/0156939 A1 * | 10/2002 | Armstrong et al. .......... 709/400 |
| 2003/0051174 A1 * | 3/2003 | Toll et al. .................... 713/300 |
| 2004/0194096 A1 * | 9/2004 | Armstrong et al. .......... 718/100 |

FOREIGN PATENT DOCUMENTS

| | | | |
|---|---|---|---|
| JP | 11282815 A | * | 10/1999 |
| JP | 2000353102 A | * | 12/2000 |
| JP | 2001-521216 | | 11/2001 |
| JP | 2001-350638 | | 12/2001 |
| JP | 2002-123402 | | 4/2002 |
| JP | 2002-540505 | | 11/2002 |
| JP | 2003-516570 | | 5/2003 |

* cited by examiner

DYNAMIC SWITCHING OF MULTITHREADED PROCESSOR BETWEEN SINGLE THREADED AND SIMULTANEOUS MULTITHREADED MODES

FIELD OF THE INVENTION

The invention relates to computers and computer software, and in particular, to multithreaded processors and switching of same between single threaded and simultaneous multithreaded modes of operation.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread.

From a software standpoint, some computers implement the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. One form of multithreaded processor, for example, supports the concurrent or simultaneous execution of multiple threads in hardware, a functionality often referred to as simultaneous multithreading (SMT).

In an SMT processor, multiple hardware threads are defined in the processor, with each thread capable of executing a particular task assigned to that thread. A suitable number of execution units, such as arithmetic logic units, fixed point units, load store units, floating point units, etc., are configured to concurrently execute instructions from multiple threads. Typically, most of the general purpose registers (GPR's) and special purpose registers (SPR's) that represent the architected state are replicated for each hardware thread in the processor. However, other on-chip resources, such as some SPR's, on-chip caches, translation lookaside buffers, and other non-architected resources are typically shared between multiple threads, with the expectation being that when one or more hardware threads are stalled on long latency events (e.g., waiting on cache misses), other threads can continue to progress and consume some of the chip resources.

For many workloads, SMT improves the overall performance (i.e., the overall throughput) of a computer system. However, this improvement often comes at the expense of the turnaround time for a single task, as each task running on an SMT processor is required to share some of the on-chip resources with other tasks concurrently running on the same processor. For example, cache access patterns of tasks running on other hardware threads can adversely affect the performance of a particular task, with the end result being a longer, and often unpredictable turnaround time for each individual task. It has been found, however, that in some applications, e.g., some scientific and engineering applications, the need for fast and predictable turnaround times of individual tasks may exceed the need for fast overall system throughput. In such instances, multithreading may actually hinder system performance.

Some multithreaded processor designs also support the ability to execute in a single threaded mode, thus effectively disabling SMT and permitting tasks to run with a more predictable turnaround time. However, support for such functionality requires that switches between single-threaded and multithreaded modes occur via system restarts, or Initial Program Loads (IPL's). Given the availability requirements of many high performance computer systems, however, system restarts are highly undesirable, and often unacceptable to many customers.

In addition, even when it is desirable to operate a processor in an SMT mode, inefficiencies can still arise due to the consumption of shared resources by the various hardware threads in the processor. For example, even when a hardware thread is executing an idle loop, and thus performing no useful activities, shared resources are still being consumed by the hardware thread, thus taking resources away from other active threads that might otherwise be able to use such resources. As a result, suboptimal performance can occur due to this consumption of resources by threads that are not performing useful work on behalf of the system.

It would be highly desirable to facilitate the ability to provide greater control over the resources consumed by hardware threads executing in a multithreaded processor, in particular, to reduce the inefficiencies that may occur due to the inefficient allocation of resources among one or more of such threads in a multithreaded processor.

SUMMARY OF THE INVENTION

The invention addresses these and other problems associated with the prior art by providing a method that utilizes a multithreaded processor having at least one hardware thread among a plurality of hardware threads that is capable of being selectively activated and deactivated responsive to a control circuit. Furthermore, the control circuit additionally provides the capability of controlling how an inactive thread can be activated after the thread has been deactivated, typically through the specification of a reactivation condition for the thread.

Through the provision of a control circuit that can control both whether a hardware thread is active or inactive, and how an inactive thread can be activated, a number of useful performance enhancements may be realized. For example, some embodiments consistent with the invention support the ability to control how an inactive thread can be activated by controlling whether a thread can be reactivated in response to an interrupt. Enabling an inactive thread to be activated in response to an interrupt may permit, for example, a thread to be effectively taken "offline" with little system overhead, permitting any processor resources consumed by that thread to be utilized by other threads, but still permitting the deactivated thread to be quickly and efficiently reactivated via an interrupt to resume operations. As such, it may be possible, for example, to enable the shared resources consumed by a thread executing in an idle loop to be released for use by other threads, yet still permit the thread to be reactivated (and the shared resources reacquired) relatively quickly, and with little system overhead.

Conversely, disabling the ability for a thread to be activated in response to an interrupt may support the ability to release shared resources for an extended period of time in favor of more efficient operation of any threads that are still active in a multithreaded processor. Furthermore, given that protection is afforded against reactivation via an interrupt, often threads may be activated or deactivated without requiring a system restart. As such, even in instances of prolonged deactivation of a hardware thread, system availability is rarely if ever compromised.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter support the dynamic activation and deactivation of selected hardware threads in a multithreaded processor, as well as the selective control of how inactive hardware threads may be activated once deactivated.

A multithreaded processor consistent with the invention is typically a simultaneous multithreaded processor, although other forms of multithreaded processors may be used in the alternative. Moreover, practically any number of hardware threads may be supported in a multithreaded processor consistent with the invention, and any number of such hardware threads may be selectively activated in the manner discussed herein. For example, in the illustrated embodiments, a simultaneous multithreaded (SMT) processor is disclosed as including two hardware threads, with one such thread being capable of being selectively deactivated to switch the processor between SMT and single-threaded (ST) modes.

The selective control of how an inactive hardware thread may be activated once deactivated is typically based upon a reactivation condition that is specified for a particular thread or processor, and may vary in a number of manners consistent with the invention. For example, in the illustrated embodiments, a reactivation condition may be based upon the selective enablement of thread activation responsive to interrupts such as inter-processor interrupts (IPI's), I/O interrupts, timer or decrementer interrupts, etc. However, it will be appreciated that other controls that limit the ability of a thread to be activated may be used in the alternative.

Figure 1:
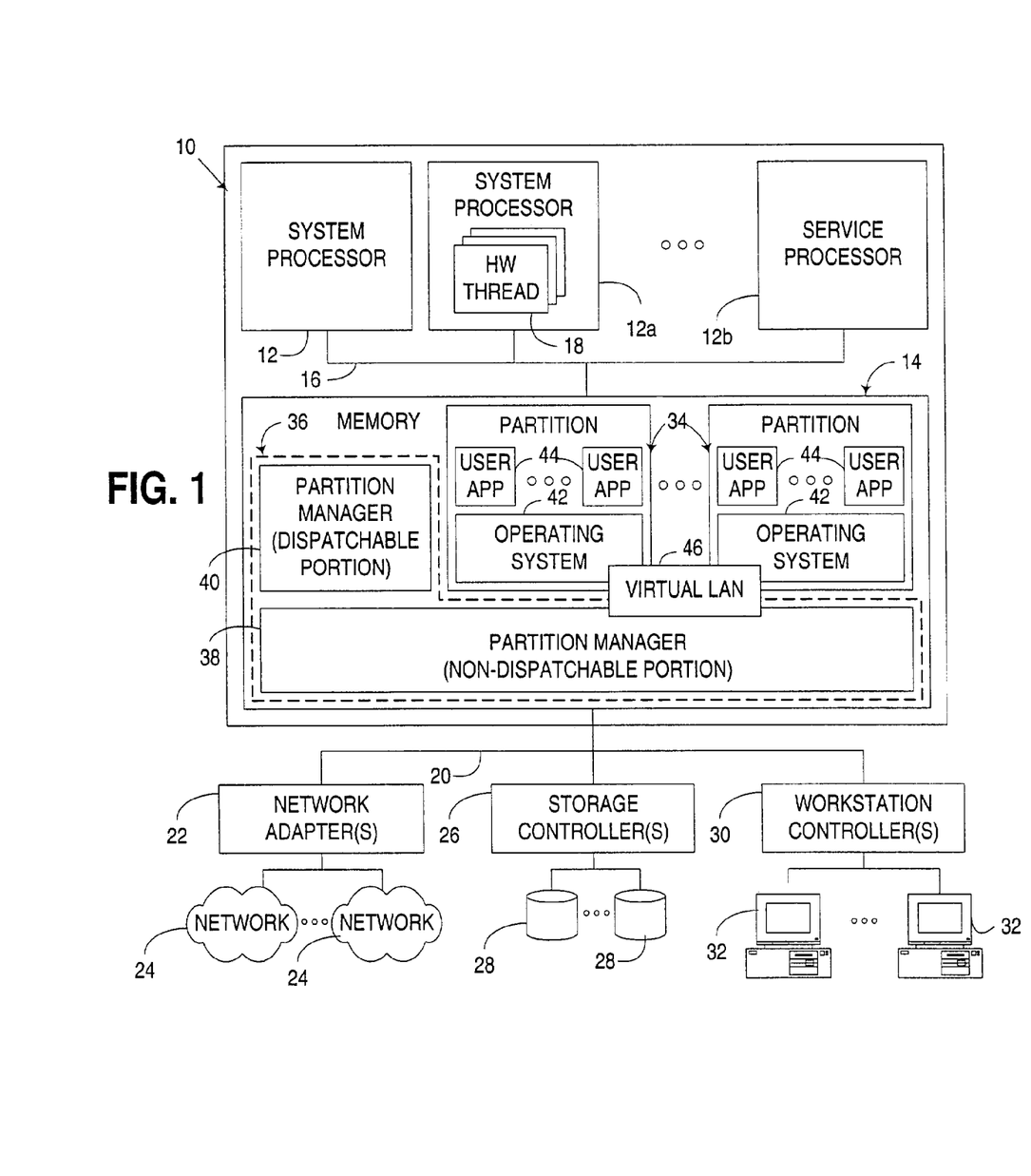
FIG. 1 is a block diagram of the principal hardware components in a logically-partitioned computer consistent with the invention.

Turning now to the Drawings, wherein like numbers denote like parts throughout the several views, FIG. 1 illustrates the principal hardware components in a logically-partitioned computer 10 consistent with the invention. Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). In addition, the invention may also be utilized in connection with non-logically partitioned multithreaded computers.

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multithreaded processor 12a is treated like an independent processor by the software resident in the computer. In this regard, for the purposes of this disclosure, a single threaded processor will be considered to incorporate a single hardware thread, i.e., a single independent unit of execution. It will be appreciated, however, that software-based multithreading or multitasking may be used in connection with both single threaded and multithreaded processors to further support the parallel performance of multiple tasks in the computer.

In addition, as is also illustrated in FIG. 1, one or more of processors 12 (e.g., processor 12b) may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manner other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via a bus 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 1 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12*b*. The non-dispatchable portion 38 provides many of the low level partition management functions for computer 10, e.g., page table management, etc. The non-dispatchable portion 38 also has no concept of tasks, and is accessible principally via function calls from higher layers of software.

The second layer of program code in partition manager 36 is referred to herein as a dispatchable portion 40. In contrast to non-dispatchable portion 38, which has no concept of tasks, is run with relocation off, and is accessible via function calls from higher layers of software, the dispatchable portion 40 has the concept of tasks (like any operating system), and is run with relocation on. The dispatchable portion typically executes in much the same manner as a partition, except that it is hidden from the user. The dispatchable portion generally manages higher level partition management operations such as creating and deleting partitions, concurrent I/O maintenance, allocating processors, memory and other hardware resources to various partitions 34, etc.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 40 that is separate from any partition 34, the functionality of the dispatchable portion may be incorporated into one or more logical partitions in the alternative.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

As noted above, the illustrated embodiments may be utilized to address a number of problems that may arise in systems that utilize multithreaded processors. One such problem occurs as a result of slower and indeterminate turn around times for individual tasks when executed in a multithreading environment. It has been found that when reliable and fast turn around for a single task is desired, it may be desirable to switch a mode for a multithreaded processor to disable one or more threads, e.g., by operating the processor in a single-threaded (ST) mode. Moreover, it is often desirable that the mode switch occur without having to reboot the system. It has also been found that it would also be desirable to similarly enable a switch from a single-threaded mode to a multi-threaded (e.g., a simultaneous multithreading (SMT)) mode, also without having to reboot the system.

Another problem that may be addressed is the consumption of shared resources in a multithreaded processor by hardware threads that are not performing productive work on behalf of the system. As will become more apparent below, a hardware thread typically appears to an operating system as an independent logical processor. As such, when a thread is operating in an idle loop of an operating system, and is not doing any useful work, that thread is consuming certain shared resources of the processor and affecting the performance of other threads on the processor. It would therefore be desirable to enable an operating system to switch a processor to single threaded mode when the thread is idle, and return the processor to SMT mode when work is available for the logical processor, or when the logical processor is required to service an interrupt. However, it has been found that putting a processor in single threaded mode may appear to the operating system as if the processor is going off line. From an operating system perspective, taking a logical processor off line is typically an expensive operation. Moreover, the overhead of taking a logical processor off-line and returning it to an on-line status when work is required may be such that nothing is gained by disabling a thread when the thread enters an idle loop. It would be desirable to provide a mechanism to permit an operating system to switch between single threaded and SMT mode with little overhead such that short-term periods where a thread is not performing useful work may trigger a deactivation of a thread to free up shared resources for use by other threads.

Therefore, in the illustrated embodiment, it is desirable to provide an ability to switch a multithreaded processor between single threaded and SMT modes without requiring a system restart or other limitation on the availability of a computer. Furthermore, it is desirable to support the capability to place a processor in single threaded mode to boost performance of an active thread in such a way that the inactive thread appears to be on-line to the rest of an operating system.

To address these concerns, the illustrated embodiment supports a per-processor register, referred to herein as a "control" or "CTRL" register, that controls whether the processor is running in single threaded or SMT mode. In addition, another per-processor register is provided to control how an inactive thread can be revived, e.g., via an external interrupt such as a timer or decrementer interrupt, an interprocessor interrupt, an I/O interrupt, etc. The latter register is referred to in the illustrated embodiment as a Hardware Implementation Dependent (HID) register, and it is this register that stores the reactivation condition specified for a particular thread. As will become more apparent below, when interrupts are disabled, typically a thread can be revived only by an explicit action by another active thread in the system.

Using the aforementioned mechanisms, if an operating system deems it desirable to run a processor in single threaded mode for an extended period of time, the operating system may select one or more threads on that processor to make inactive. The operating system may then take the logical processors corresponding to the target threads off-line. As part of taking a logical processor off-line, the operating system may ensure that the thread will not be interrupted by an external interrupt source through appropriate control of the HID register, e.g., to specify a reactivation condition whereby interrupts are disabled. The thread may then go into a dead mode, whereby the thread is revivable only by an explicit operation by an active thread on the processor. In such a mode, no state is maintained either in the hardware or in the software for a dead thread. The thread then is able to make itself inactive by writing the appropriate bits to the CTRL register.

To address the other problem noted above whenever a logical processor corresponding to a thread goes into an idle loop, an operating system may make that thread inactive by writing to the CTRL register. Moreover, the operating system may program the HID register such that the reactivation condition specifies that the thread can be revived by an external interrupt, e.g., an I/O interrupt, an interprocessor interrupt, a timer interrupt, etc. The thread may then be placed in a "dormant" mode, where the state is maintained by the software, but the hardware takes away all resources from the dormant thread and allocates them to one or more active threads. Whenever an interrupt is triggered, the thread may then be revived and the corresponding logical processor returned to its idle loop to determine whether it has any work to do as a result of the triggered interrupt. For example, if a decrementer or timer expires or an I/O interrupt becomes pending, the thread may be revived to permit the corresponding logical processor to determine whether any work is required as a result of the interrupt. Furthermore, if another processor wishes to make a task available for the logical processor corresponding to the inactive thread, the other processor can revive the inactive thread by sending an inter-processor interrupt to the inactive thread, causing the logical processor to enter its idle loop to check for additional work. Also, if desired, the thread may be explicitly revived by another thread in the system, as with a dead thread.

Figure 2:
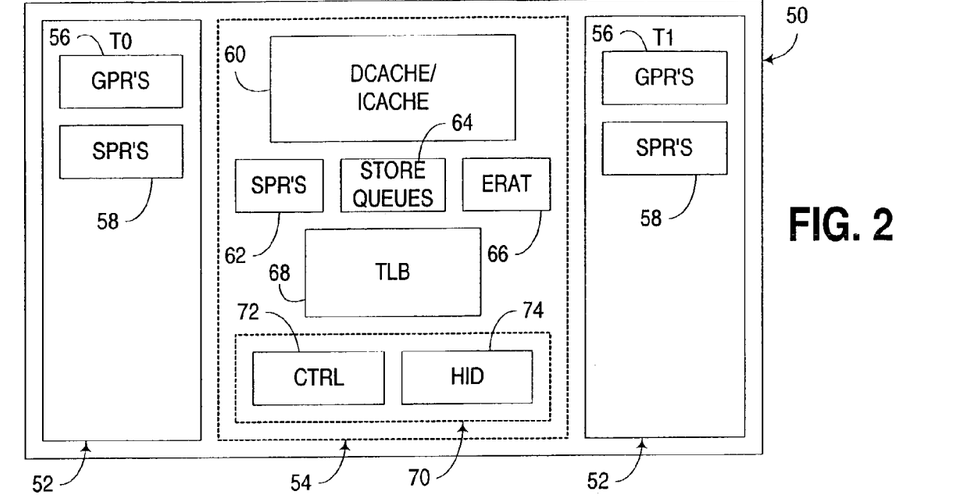
FIG. 2 is a block diagram of shared and dedicated resources utilized in the multithreaded processor referenced in FIG. 1.

Now turning to FIG. 2, one specific implementation of the invention in logically-partitioned computer 10 (FIG. 1) is illustrated. Specifically, FIG. 2 illustrates an exemplary multithreaded processor 50 including a pair of hardware threads 52, designated as threads T0 and T1, which are configured to share a plurality of shared resources designated at 54. Each thread has a number of dedicated resources, e.g., a set of general purpose registers (GPR's) 56 and special purpose registers (SPR's) 58. In addition, each thread may share various of the shared resources 54, including, for example, on-chip cache memory 60, such as a data cache and/or an instruction cache. Moreover, various SPR's 62, as well as store queues 64, Effective to Real Address Translation (ERAT) tables 66, Translation Lookaside Buffers (TLB's) 68, etc., may be shared by threads T0 and T1. Other types of resources may also be shared between the threads in the manner described herein.

In addition, a control circuit 70, including a CTRL register 72 and an HID register 74, is also disposed in multithreaded processor 50, and is used to selectively activate and deactivate one or both of threads T0 and T1. Each thread, in particular, is assigned at least one field in each register 72, 74 to respectively specify (1) whether that thread is active or inactive, and (2) whether or not that thread may be re-activated in response to an interrupt. It will be appreciated that different data structures may be utilized as an alternative to registers 72, 74. For example, the various information in registers 72 and 74 may be combined into a single register. In addition, it will be appreciated that different shared resources 54 may also be shared among threads T0 and T1 consistent with the invention. Furthermore, it will be appreciated that any number of threads may be supported on the given multithreaded processor, and that all or only a portion of such threads may be selectively activated and deactivated in response to control circuit 70.

Control circuit 70 may also be configured to allocate shared resources between threads T0 and T1, as well as to save or discard certain state information maintained in each hardware thread, or initiate the storage and retrieval of such state information as needed. Furthermore, control circuit 70 is configured to selectively activate or deactivate a thread without requiring a system restart. Further details regarding one suitable implementation of a multithreaded processor having the characteristics described herein may be found in U.S. patent application Ser. No. 10/422,648 (now U.S. Pat. No. 7,155,600, issued Dec. 26, 2006), entitled "METHOD AND LOGICAL APPARATUS FOR MANAGING THREAD EXECUTION IN A SIMULTANEOUS MULTI-THREADED (SMT) PROCESSOR", U.S. patent application Ser. No. 10/422,649 (Expressly Abandoned Jun. 12, 2007), entitled "METHOD AND LOGICAL APPARATUS FOR MANAGING RESOURCE REDISTRIBUTION IN A SIMULTANEOUS MULTI-THREADED (SMT) PROCESSOR", and U.S. patent application Ser. No. 10/422,651, entitled "METHOD AND LOGICAL APPARATUS FOR RENAME REGISTER REALLOCATION IN A SIMULTANEOUS MULTI-THREADED (SMT) PROCESSOR", all of which filed on even date herewith and assigned to the same Assignee as the present invention, and incorporated by reference herein.

As noted above, computer 10 (FIG. 1) is configured as a logically-partitioned computer. In this computer, therefore, multiple operating systems execute in multiple logical partitions. As such, the partition manager in such a computer is configured to control whether a partition runs its processors in ST or SMT mode. It is desirable to maintain such control in the partition manager to ensure partitioning integrity of the computer. As such, the CTRL and HID registers described above are typically only writable by a partition manager whenever the computer is in a mode where it is capable of running multiple partitions.

To support the herein-described functionality, the partition manager provides services to each partition to allow such partitions to control the ST/SMT mode of each processor. Whenever a partition desires to take a logical processor off-line, a service, referred to herein as the H_STOP_SELF service, may be accessed on a thread that an operating system wishes to make inactive. Moreover, to bring a logical processor on-line after being brought off-line, a partition may invoke an H_START_LOGICAL_PROCESSOR call to the partition manager to bring the logical processor back on-line through revival of the dead thread.

When a partition wishes to make a thread dormant, e.g., in response to a logical processor entering an idle loop, the partition manager supports an H_CEDE call, which the partition manager uses to make a thread inactive in a manner that the thread can be revived by one of any number of types of interrupts. It is also desirable to permit a partition to revive a dormant thread also by invoking an H_PROD call. It will be appreciated that such calls may also be utilized for shared processor partitions, as well as partitions that rely only on dedicate processors.

Figure 3:
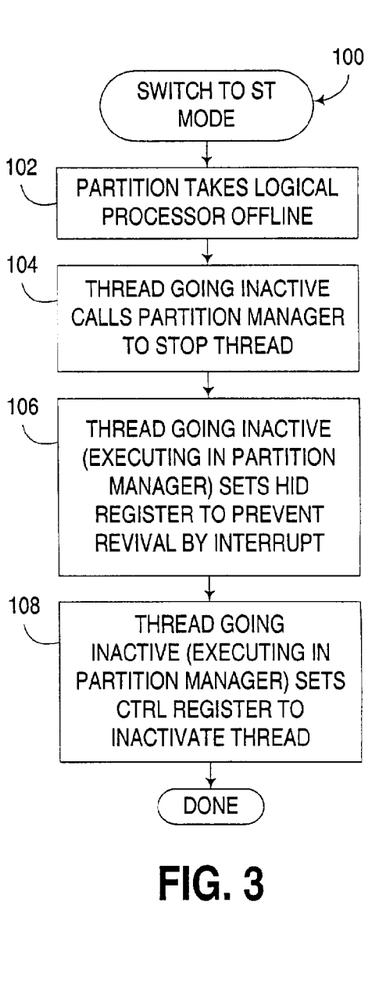
FIG. 3 is a flowchart illustrating the program flow of a switch to single threaded mode routine executed by the logically-partitioned computer of FIG. 1, to switch a multithreaded processor to a single threaded mode.

FIG. 3, for example, illustrates a switch to ST mode routine 100 that may be utilized to switch a multithreaded processor associated with a particular partition to a single threaded mode. Routine 100 begins in block 102 with a partition taking the logical processor associated with a thread going inactive off-line from the perspective of the operating system. Next, in block 104, the thread going inactive calls the partition manager to stop the thread, e.g., using the H_STOP_SELF call described above. Next, in block 106, the thread going inactive, which is now executing in the partition manager as a result of the aforementioned call, sets the HID register to prevent revival of the thread via an interrupt. Next, in block 108, the thread going inactive, and still executing in the partition manager, sets the CTRL register to inactivate the thread. By virtue of this operation, the control circuit in the multithreaded processor inactivates the thread, resulting in a processor switch to single threaded mode.

Figure 4:
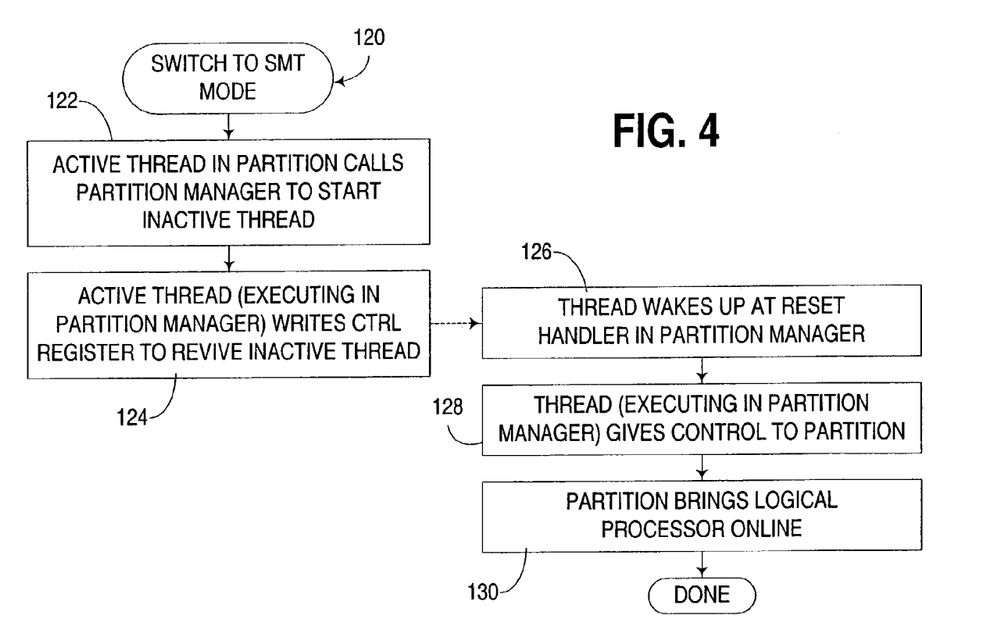
FIG. 4 is a flowchart illustrating the program flow of a switch to simultaneous multithreaded mode routine executed by the logically-partitioned computer of FIG. 1, to switch a multithreaded processor to a simultaneous multithreaded mode in a manner consistent with the invention.

To switch the aforementioned processor back to a SMT mode, routine 120 of FIG. 4 may be performed. Routine 120 begins in block 122 by an active thread in the same partition calling the partition manager to start the previously inactive thread, e.g., using the aforementioned START_LOGICAL_PROCESSOR call. Next, as shown in block 124, the active thread, executing in the partition manager, writes the CTRL register to revive the inactive thread. By doing so, the control circuit on the processor will revive the inactive thread. Next, as shown in block 126, and as represented in FIG. 4 via a separate column, the previously inactive thread wakes up in the partition manager, and in particular, in reset handler program code resident in the partition manager. Next, in block 128, the restored thread, now executing in the partition manager, gives control back to the partition that owns the thread, and as shown in block 130, the partition then brings the logical processor back on-line. Routine 120 is then complete.

Figure 5:
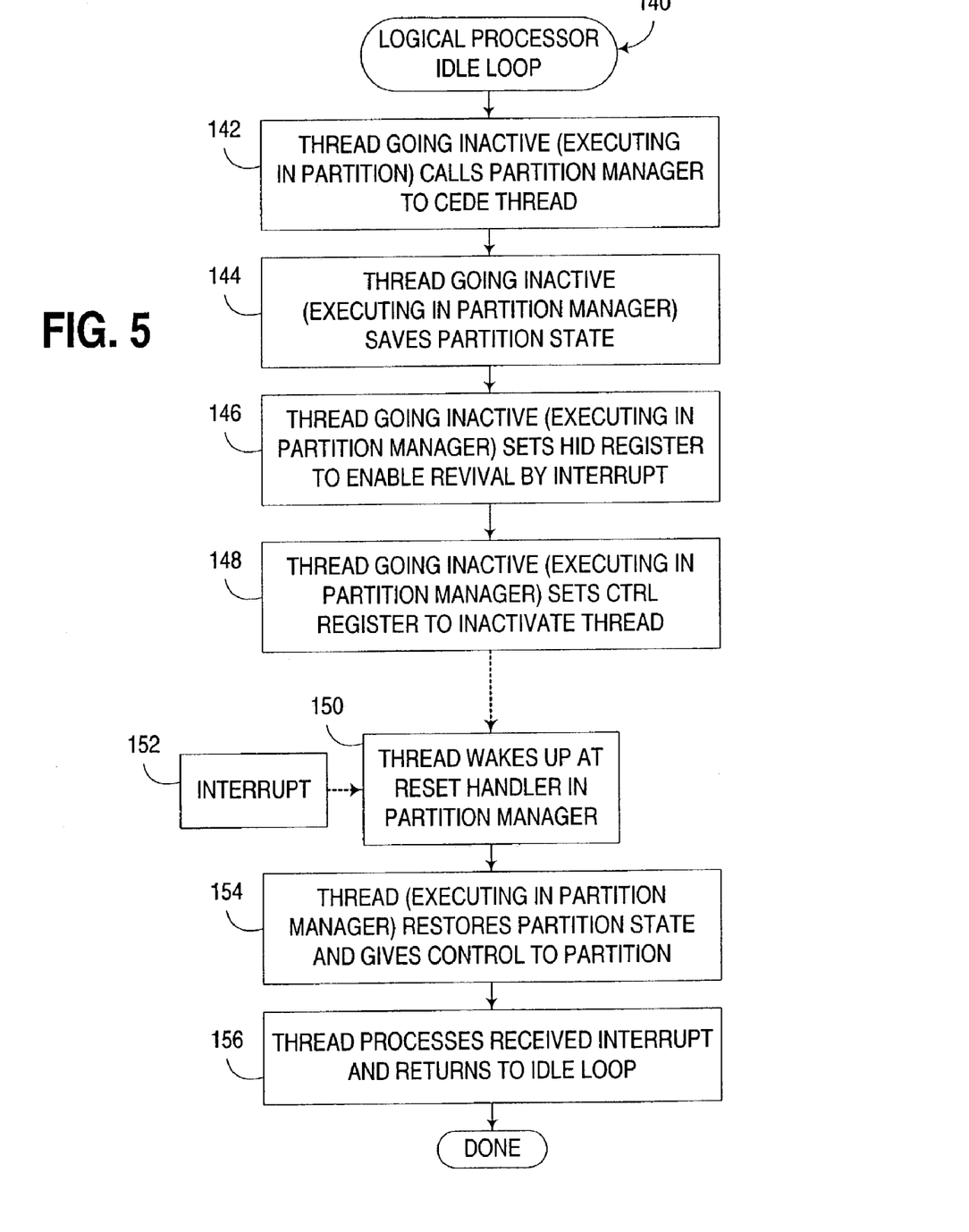
FIG. 5 is a flowchart illustrating the program flow of a logical processor idle loop routine executed by the logically-partitioned computer of FIG. 1.

Now turning to FIG. 5, a logical processor idle loop routine 140 may be executed whenever a logical processor executing in a partition enters an idle state. Routine 140 may thus briefly switch the multithreaded processor with which the logical processor is associated to a single threaded mode to free up any shared resources for consumption by other active threads in the processor.

Routine 140 begins in block 142 with the thread going inactive (currently executing in the partition) calling the partition manager to cede the thread. Next, in block 144, the thread going inactive, now executing in the partition manager as a result of the call, saves the partitioned state. Next, in block 146, the thread going inactive, again executing in the partition manager, sets the HID register to enable revival of the thread via an interrupt. Then, in block 148, the thread going inactive, still executing in the partition manager, sets the CTRL register to inactivate the thread. As a result of setting the register, the control circuit in the multithreaded processor then switches the processor to single threaded mode, thereby effectively inactivating the thread. The thread will then remain inactive until either explicitly reactivated via a write to the CTRL register by another active thread (in a similar manner to that described above in connection with FIG. 4), or alternatively, in response to the reception of an interrupt.

For example, as shown in block 150, as a result of the reception of an interrupt 152, the thread that has been inactivated as a result of a switch to single threaded mode, wakes up at reset handler program code in the partition manager. Next, as shown in block 154, the thread, still executing in the partition manager, then restores the partition state and returns control to the partition. Next, as shown in block 156, the idle loop of the logical processor is then revived to process the received interrupt. Routine 140 is then complete, and processing by the logical processor is resumed.

Figures 6, 7, 8:
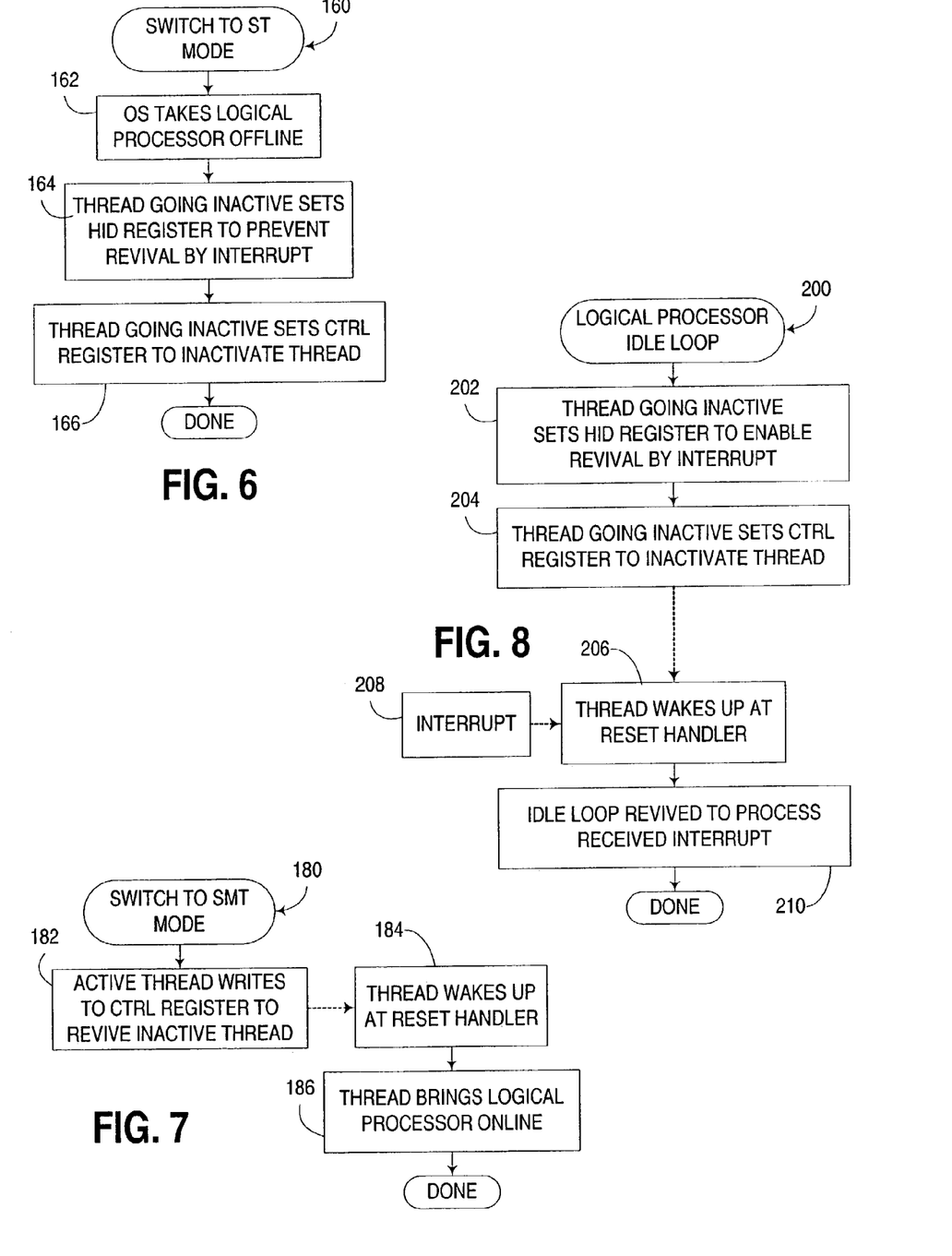
FIG. 6 is a flowchart illustrating the program flow of a switch to single threaded mode routine executed by a non-logically partitioned computer to switch a multithreaded processor to a single threaded mode in a manner consistent with the invention.
FIG. 7 is a flowchart illustrating the program flow of a switch to simultaneous multithreaded mode routine executed by a non-logically partitioned computer to switch a multithreaded processor to a simultaneous multithreaded mode in a manner consistent with the invention.
FIG. 8 is a flowchart illustrating the program flow of a logical processor idle loop routine executed by a non-logically partitioned computer.

It will be appreciated that the principles of the invention may also apply to computers other than logically-partitioned computers. For example, FIGS. 6-8 illustrate corresponding routines to those illustrated in FIGS. 4-6, but instead utilized in a non-logically-partitioned computer. FIG. 6, for example, illustrates a switch to ST mode routine 160 that may be executed by an operating system to switch a multithreaded processor to ST mode. Routine 160 begins in block 162 by taking the logical processor associated with a thread going inactive to an off-line status. Next, in block 164, the thread going inactive sets the HID register to prevent revival of the thread via an interrupt. Next, in block 166, the thread going inactive sets the control register to inactivate the thread, whereby the control circuit on the processor inactivates the thread as described above. Routine 160 is then complete.

Next, as shown in FIG. 7, a switch to SMT mode routine 180 may revive an inactive thread in response to a write to the CTRL register by another active thread executing in the computer (block 182). As a result of the write to the CTRL register, and as represented by a separate column in FIG. 7, the thread that was previously inactivated wakes up at reset handler program code in the operating system (block 184). Once woken up, the thread then brings the logical processor back on-line (block 186). Once the logical processor is then on-line, execution resumes in a conventional manner, and routine 180 is complete.

FIG. 8 illustrates a logical processor idle loop routine 200, which begins in block 202 with the thread going inactive, setting the HID register to enable revival of the thread via an interrupt. Then, as shown in block 204, the thread going inactive sets the CTRL register to inactivate the thread, thereby signaling to the control circuit on the multithreaded processor that the thread should be inactivated.

At some point in the future, the thread may be reactivated as shown at block 206 in response to the reception of an interrupt 208. Once the interrupt is received, the thread wakes up at reset handler program code in the operating system. Then, as shown in block 210, the idle loop is revived to process the received interrupt. The logical processor then resumes in a conventional manner, and routine 200 is complete.

As such, it may be seen that embodiments consistent with the invention support the ability to selectively and dynamically activate and deactivate hardware threads in a multi-threaded processor, and often without requiring a system restart. Various modifications to the herein-described embodiments will be apparent to one of ordinary skill in the art having the benefit of the instant disclosure. Therefore, the invention lies in the claims hereinafter appended.

What is claimed is:

1. A method of controlling a multithreaded processor resident in a logically partitioned computer, wherein the multi-threaded processor supports the execution of a plurality of hardware threads, wherein the logically partitioned computer comprises a plurality of partitions and a partition manager, wherein a first hardware thread among the plurality of hardware threads is assigned to a logical processor resident in a first partition among the plurality of partitions, and wherein the method comprising:

in connection with taking the logical processor offline in the first partition, deactivating the first hardware thread while inhibiting reactivation of the first hardware thread in response to assertion of an interrupt; and in response to the logical processor entering an idle loop, deactivating the first hardware thread while permitting reactivation of the first hardware thread in response to assertion of an interrupt.

2. A method of controlling a multithreaded processor that supports the execution of a plurality of hardware threads, the method comprising:

specifying a reactivation condition for a first hardware thread among the plurality of hardware threads executed by the multithreaded processor, the reactivation condition determining how the first hardware thread may be activated once the first hardware thread has been deactivated, wherein the reactivation condition specifies whether the first hardware thread may be activated in response to assertion of an interrupt such that the first hardware thread is prevented from being reactivated in response to assertion of an interrupt if so specified by the reactivation condition;

deactivating the first hardware thread; and selectively reactivating the first hardware thread based upon the reactivation condition specified for the first hardware thread;

wherein the multithreaded processor includes a control circuit configured to selectively activate and deactivate the first hardware thread, the control circuit further configured to reactivate the first hardware thread based upon the reactivation condition, wherein the control circuit comprises at least one register, and wherein the at least one register includes first and second registers, the first register specifying whether the first hardware thread is active or inactive, and the second register specifying the reactivation condition.

3. The method of claim 2, wherein the interrupt includes at least one of an external interrupt, inter-processor interrupt, input/output interrupt and timer interrupt.

4. The method of claim 2, further comprising selectively preventing the first hardware thread from being reactivated in response to assertion of an interrupt generated while the first hardware thread is deactivated in response to the reactivation condition specifying that the first hardware thread may not be activated in response to assertion of an interrupt.

5. The method of claim 2, wherein the reactivation condition specifies whether the first hardware thread may be activated in response to assertion of any interrupt such that the first hardware thread is prevented from being reactivated in response to assertion of any interrupt if so specified by the reactivation condition.

6. A method of controlling a multithreaded processor that supports the execution of a plurality of hardware threads, the method comprising:

specifying a reactivation condition for a first hardware thread among the plurality of hardware threads executed by the multithreaded processor, the reactivation condition determining how the first hardware thread may be activated once the first hardware thread has been deactivated, wherein the reactivation condition specifies whether the first hardware thread may be activated in response to assertion of an interrupt such that the first hardware thread is prevented from being reactivated in response to assertion of an interrupt if so specified by the reactivation condition;

deactivating the first hardware thread; and selectively reactivating the first hardware thread based upon the reactivation condition specified for the first hardware thread;

wherein the multithreaded processor is disposed in a computer comprising a plurality of partitions and a partition manager that controls the plurality of partitions, and wherein specifying the reactivation condition and deactivating the first hardware thread are performed by the partition manager, wherein the first hardware thread is associated with a logical processor executing in one of the plurality of partitions, and wherein the partition manager is configured to specify a reactivation condition that inhibits reactivation of the first hardware thread in response to assertion of an interrupt in connection with a partition taking the logical processor off-line.

7. The method of claim 6, further comprising, in connection with a partition bringing the logical processor back online, reactivating the first hardware thread using a second hardware thread executing program code for the partition manager.

8. The method of claim 6, wherein the first hardware thread is associated with a logical processor executing in one of the plurality of partitions, the method further comprising detecting with a partition that the logical processor is executing in an idle loop, and in response thereto, specifying a reactivation condition that permits reactivation of the first hardware thread in response to assertion of an interrupt.

9. The method of claim 8, wherein selectively reactivating the first hardware thread based upon the reactivation condition specified for the first hardware thread includes reactivating the first hardware thread in response to assertion of an interrupt, wherein the logical processor is configured to process the received interrupt.

10. The method of claim 9, farther comprising saving a state of a partition with which the logical processor is associated in connection with the logical processor entering the idle loop, and restoring the state of the partition with which the logical processor is associated in response to assertion of the interrupt.

11. A method of controlling a multithreaded processor that supports the execution of a plurality of hardware threads, the method comprising:

specifying a reactivation condition for a first hardware thread among the plurality of hardware threads executed by the multithreaded processor, the reactivation condition determining how the first hardware thread may be activated once the first hardware thread has been deactivated, wherein the reactivation condition specifies whether the first hardware thread may be activated in response to assertion of an interrupt such that the first hardware thread is prevented from being reactivated in response to assertion of an interrupt if so specified by the reactivation condition;

deactivating the first hardware thread; and selectively reactivating the first hardware thread based upon the reactivation condition specified for the first hardware thread;

wherein the multithreaded processor is disposed in a computer comprising an operating system, wherein the first hardware thread is associated with a logical processor, wherein specifying the reactivation condition and deactivating the first hardware thread are performed by the operating system, wherein the operating system is configured to specify a reactivation condition that inhibits reactivation of the first hardware thread in response to assertion of an interrupt in connection with the logical processor being taken off-line, and wherein the operating system is configured to specify a reactivation condition that permits reactivation of the first hardware thread in response to assertion of an interrupt in connection with the logical processor entering an idle loop.

* * * * *